FIG. 2

INVENTOR
RICHARD K. SHELBY

R. K. SHELBY 3,667,885

MOLDING MACHINES

Filed Nov. 5, 1970

INVENTOR
RICHARD K. SHELBY

BY
Robert J. Schaap
ATTORNEY

FIG. 6

United States Patent Office 3,667,885
Patented June 6, 1972

3,667,885
MOLDING MACHINES
Richard K. Shelby, 1320 Sandburg Terrace,
Chicago, Ill. 60610
Filed Nov. 5, 1970, Ser. No. 87,024
Int. Cl. B29c *17/04*
U.S. Cl. 425—155          24 Claims

ABSTRACT OF THE DISCLOSURE

A driving mechanism for molding machines, presses and the like, where a platen is shifted with respect to a thermoplastic web. The drive mechanism includes a rotating crank which shifts a drive bar through a path where it causes a drive link to shift the platen to and from a molding position. The crank arm and an oscillating link which is connected to the other end of the drive bar creates a path of movement for the drive link which includes a dwell period sufficient for the platen to remain in the molding for a preselected amount of time.

---

This invention relates in general to certain new and useful improvements in molding machines, and more particularly, to positive pressure forming apparatus for molding machines used in the formation of plastic articles.

Today, there have been widespread advancements in the packaging industry with the introduction of containers formed of plastic and synthetic resinous materials. In fact, it has become a common practice to manufacture thin-walled disposable containers such as drinking cups, ice cream cups, and the like from moldable, thermoplastic materials such as polystyrene and modified polystyrene. There are a large number of commercially available molding machines which are designed to form thin-walled containers from sheets of thermoplastic material. In this art of forming articles from thermoplastic materials, the injection molding and pressure molding methods have been most advantageously employed. Molding machines which employ the pressure molding method generally comprise a device for feeding a sheet of thermoplastic material, either intermittently or continuously, between cooperating dies. The dies are adapted to engage the movable web of thermoplastic material generally in a shifting movement and form the plastic material to a shape generally conforming to that of the receiving die.

The pressure or so-called vacuum molding process employs the vacuum as an assist for drawing the thermoplastic web into the die along with the mechanical engagement of the web by a plug assist. It has been found that the overall thickness of the walls of the article produced are more uniform when a vacuum assist is employed with the mechanical engagement of the web in causing the deformation of the web. This type of device is designed so that the side of the sheet which is formed by the male die is generally maintained at atmospheric pressure while the side of the sheet which is formed within the female die is maintained at pressures less than atmospheric pressure to provide the vacuum forming of the plastic article. Moreover, this type of operation generally eliminates undesirable flow lines which present an undesirable appearance to the finally shaped article. There have also been recent attempts to employ positive air pressure assists around the male die to obtain a greater pressure differential. However, all of such attempts, to date, have been ineffective for a number of reasons.

Devices of this latter mentioned type, namely the devices which employ the differential air pressure must necessarily include an effective sealing means between the die frames in order to achieve an adequate pressure differential. In many of these devices, the die frames may shift longitudinally with the moving web on a suitable carriage as the web is fed continuously into the molding machine. The die frames reciprocatively shift longitudinally for a predetermined distance and are then automatically returned to their initial position. In other devices, the die frames are stationarily mounted with respect to the web and the web is intermittently halted in its operation during the actual molding. However, in each of these devices it is quite difficult to maintain adequate sealing between the thermoplastic web and the male and female die frame so that both a positive pressure and a vacuum assist may be employed on opposite sides of the web. This problem is even more considerable when the plastic web and the continuously moving die frames are operating at relatively high rates of speed.

Furthermore, in all of the devices presently available, whether they employ a continuously moving web, or a web which is intermittently halted, the die frames are shifted toward and away from the web of thermoplastic material by either pneumatically or hydraulically actuated cylinders. This type of driving means is not generally sufficient to withstand the considerable pressure often employed in molding machines of this type. Consequently, the finally molded articles often lack a uniformity of thickness and hence are not desirable from a commercial standpoint. There have been a number of attempts to use cams as a mechanism for driving the particular die frame, such as the type of driving mechanism described in U.S. Letters Patent No. 3,105,270. However, devices of this type are not particularly efficient and are very costly to manufacture.

OBJECTS

It is, therefore, the primary object of the present invention to provide a molding machine which is capable of providing a positive pressure seal between a web of thermoplastic material and cooperating die frames which shift into and out of contact with the thermoplastic material.

It is another object of the present invention to provide a driving mechanism for molding machines and similar devices which is capable of maintaining a positive pressure seal between a moving web of thermoplastic material and die frames which shift in a direction perpendicular to the web.

It is a further object of the present invention to provide a driving mechanism of the type stated which is capable of being used with molding machines which employ continuously moving webs of moldable material and with molding machines which intermittently halt the movement of the thermoplastic web during molding operations thereof.

It is also an object of the present invention to provide a driving mechanism of the type stated having a locking means which is capable of resisting positive pressure forces and thereby maintains effective sealing during molding operations.

It is yet another object of the present invention to provide a molding machine of the type stated which is highly efficient in its operation and is capable of mass producing molded articles of relatively uniform thickness and at a low unit cost.

It is another salient object of the present invention to provide a driving mechanism of the type stated which is relatively rigid in its construction and efficient in its operation.

With the above and other objects in view, my invention resides in the novel features of form, construction, arrangement and combination of parts presently described and pointed out.

GENERAL DESCRIPTION

Generally speaking, the present invention relates to a modified form of the molding machine described in U.S. Letters Patent No. 2,967,328 to R. K. Shelby et al. with substantial improvements in the driving means for shifting the lower and upper die frames. The molding machine of the present invention generally comprises an outer supporting structure. Operatively mounted on the supporting structure and being adapted for reciprocative movement in a substantially horizontal path is a molding carriage. The molding machine is also provided with a conveyor system for advancing a web of thermoplastic material along a substantially horizontal path concurrently with the movement of the molding carriage through the machine. The molding machine is further provided with a timing mechanism for intermittently shifting the molding carriage in the direction of the advancing web of thermoplastic material for a preselected distance and at the same relative rate of speed as the web. After the carriage has been shifted to its forwardmost advanced position in the direction of movement of the web, it is automatically returned to its original position. A shifting movement of the molding carriage to its forwardmost position and return to its original position constitutes one molding cycle.

Operatively mounted on the longitudinally shifting molding carriage are a pair of upper and lower die frames which are disposed on opposite sides of the advancing web of thermoplastic material. The die frames are suitably provided with male and female die elements which are adapted to engage portions of the thermoplastic web and form the material contained in these portions of the web into molded articles. The upper and lower die frames are shifted into and out of engagement with the web in timed relation to the movement of the web and in timed relation to the longitudinally shifting movement of the carriage frame. In this manner, the molding operation is continuous and uninterrupted during the actual forming of the thermoplastic material. A web clamping support plate having a series of web clamping rings is operatively shiftable with the lower die frame and is adapted to engage the underside of the web of thermoplastic material during the actual forming operation.

It should be recognized that it is possible to use the driving mechanism of the present invention on molding machines which employ vertically shiftable die frames but which die frames do not move contemporaneously with the web of material during the molding operation. In these types of molding machines, the web is moved intermittently so that a portion thereof is disposed between the die frames during the actual molding operation. The two die frames will shift toward and away from each other to form the article in the web of thermoplastic material. In like manner, it is possible to employ one stationary die frame and one movable die frame.

The means for shifting the lower die frame in timed relation to the upper die frame and the movable web comprises a rotating powered link in the form of a crank arm rotated by a conventional electric motor and which causes the powered link to rotate in timed relation to the movement of the web. A driving rod or so-called "follower link" is pivotally connected at one end to the free end of the powered link. At its opposite end, the follower link is eccentrically connected to an oscillating link, also in the form of a crank arm, and is pivotally mounted on the molding carriage. The oscillating link is also larger than the powered link.

A driving link is pivotally connected to the follower link intermediate its points of pivotal connection and is also pivotally connected to the lower die frame. The drive rod is pivotally connected in such manner so that as the powered link rotates, the drive rod will cause the point of pivotal connection of the follower link and driving link to define a path of movement where the lower die frame will shift upwardly in a substantially uniform motion.

A cam is mounted on the molding carriage and has a camming surface which coincides with the path of movement at the aforesaid point of pivotal connection. A cam follower is connected to the point of pivotal connection of the follower link and driving link and rides about the camming surface to cause the driving link to shift the lower die frame. Furthermore, the camming surface is so designed so that a dwell period exists when the driving link is shifted to a point where the lower die frame is in its uppermost position. This dwell period exists for a period of time necessary to form the web where no vertical movement of the drive link exists during a molding cycle. During this dwell period, the lower die frame is located in its uppermost vertical position, that is in the molding position.

A drive rod is, in turn, connected to a bell crank system for shifting a positive pressure plate and for shifting the upper die frame in timed relationship to the movement of the lower die frame. This drive shaft is also connected to the means for shifting the lower die frame in order to provide the proper timing relationship. A portion of the mechanism for shifting the positive pressure plate and the upper die frame is also more fully described in my U.S. Pat. No. 3,268,952.

DETAILED DESCRIPTION

Referring now in more detail and by reference characters to the drawings which illustrate a preferred embodiment of the present invention, A designates a molding machine which is substantially similar to the molding machine described in the aforementioned Shelby et al. Pat. No. 2,967,328 and which is adapted to form relatively thin-walled containers from a continuously moving web 1 of thermoplastic material. The containers which are formed on the continuously moving web 1 are molded in successive groups consisting of six rows of seven cups across with all the cups in this group being formed in one molding cycle of the machine.

The molding machine A generally comprises a main supporting frame 2 which includes upper and lower frame structures 3, 4. The two frame structures 3, 4 are substantially rectangular in horizontal cross section and connected by uprights 5. The remainder of the main supporting frame 2 is more fully described in the aforementioned Shelby et al. patent and is, therefore, neither illustrated nor described in detail herein. The web of thermoplastic material 1 is formed in a suitable extruding apparatus (not shown) which is mounted on the supporting frame 2 and which is also more fully described in the Shelby et al. patent.

Figure 2:
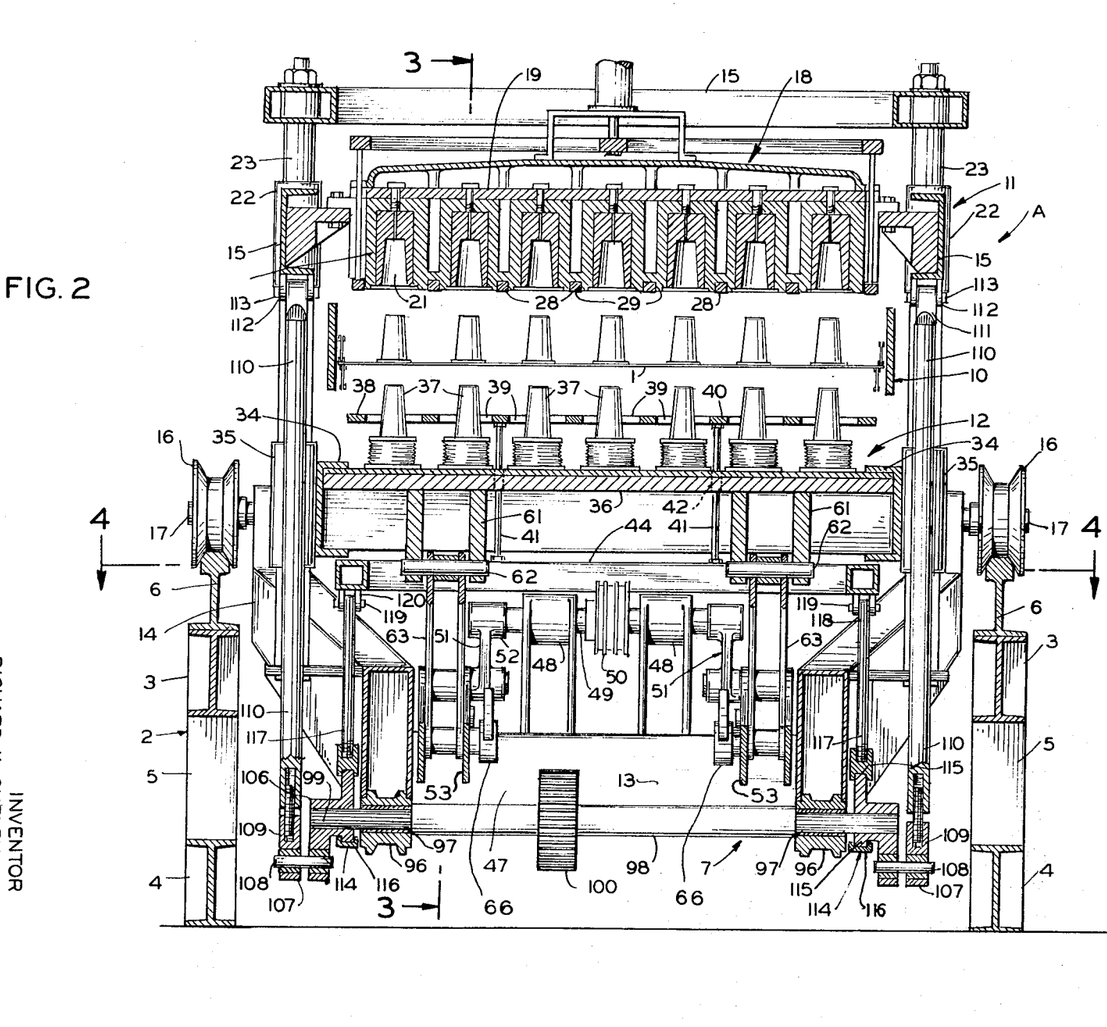
FIG. 2 is a transverse sectional view taken along line 2—2 of FIG. 1 with the upper and lower die frames forming part of the molding machine in the extended portion.

Welded or otherwise rigidly secured to the main supporting frame 2 are a pair of transversely spaced longitudinally extending carriage supporting rails 6 which support a traveling molding carriage 7 substantially as shown in FIG. 2. The carriage 7 is shiftable along the rails 6 for reciprocative movement in a horizontal direction and longitudinally with respect to the main supporting frame 2.

The power mechanism for driving the carriage 7 on the main supporting frame 2 is not part of the inventive concept herein and is, therefore, neither illustrated nor described in detail. This mechanism is, however, more fully described in each of the aforementioned patents. The web 1 is advanced continuously through the machine by a web conveying and gripping structure 10 and the carriage 7 is reciprocated in its forward and retracting movements so that it intermittently advances through a predetermined path at the same speed as the movement of the web 1 and during its forward movement, the molding elements carried thereon cooperate and engage the web 1 to form a series of containers on a predetermined area of the web 1. The forming operations are completed when the carriage 7 reaches the end of its path in the direction of the advancing movement of the web 1, that is from right to left, reference being made to FIG. 1, and the carriage is then returned to its initial starting position with the molding elements free of the web 1 and the cycle of operation is then repeated.

The molding carriage 7, which is in the form of a box-like frame structure comprises a substantially rectangular upper carriage frame 11 and a lower carriage frame 12, the latter including a substantially rectangular base 13 and four obliquely and upwardly extending legs 14. The upper carriage frame 11 includes oppositely facing longitudinally extending struts 15. An integrally formed upstanding block extending upwardly from each of the legs 14 and carry internally flanged rollers 16 on stub shafts 17 for supporting the carriage 7 along the rails 6.

The upper carriage frame 11 carries thereon a sub-frame or so-called die frame 18 of generally rectangular shape and which is spaced below the struts 15. The vertically moveable sub-frame 18 carries an interior frame structure which in turn retains a horizontally disposed support plate 19.

Secure to the underside of the support plate 19 by means of bolts (not shown) is a die holding block 20 which carries a series of female die members or cavities 21. The remainder of the structure comprising the die holding block 20 and the cavities 21 is substantially as illustrated and described in the aforementioned Shelby et al. patent and is, therefore, neither illustrated nor described in detail herein. However, it can be seen that the die-frame 18 is provided with a series of transversely extending ribs r which engage the upper surface of the die holding block 20 and the operating structure mounted thereon (not shown). A rib r is provided for each row of cavities 21 and engages that portion of the upper die holding block 20. Since the male die elements, to be hereinafter described, are maintained under pressure, the upper die holding block 20 is subjected to a much greater upwardly directed force. The ribs r provide the necessary support to prevent the upper die holding block 20 from vibrating within the die frame 18 during the molding operations.

Figure 1:
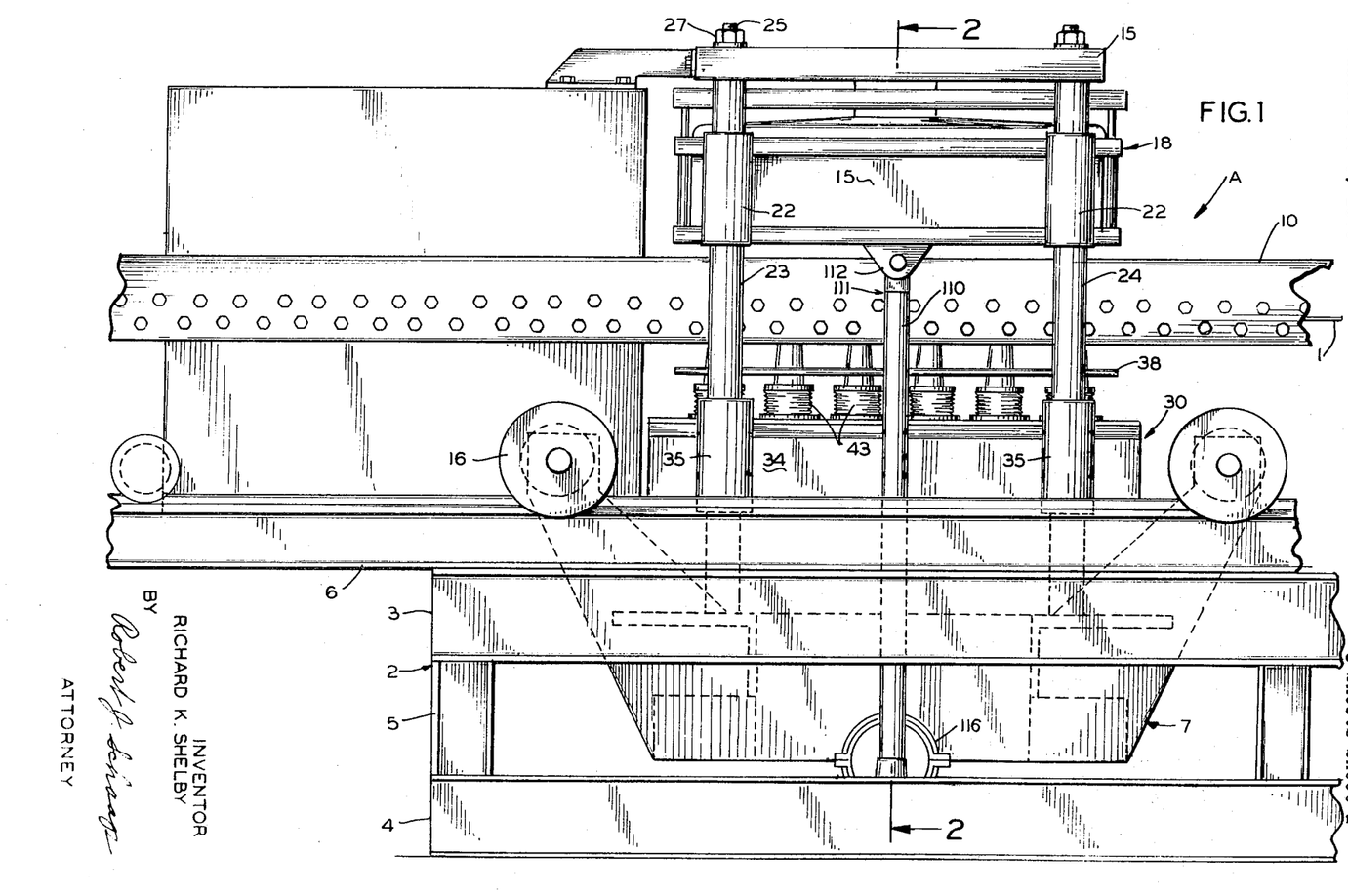
FIG. 1 is a side elevational view of the molding machine constructed in accordance with and embodying the present invention.

The die frame 18 is integrally provided with guide sleeves 22 at each corner and which are shiftable along forward and rearward vertically extending pairs of guide rods 23, 24 which extend between the upper and lower carriage frames 11, 12 in the manner as shown in FIG. 1. By reference to FIG. 5, it can be seen that the guide rods 23, 24 have diametrally reduced threaded upper ends 25, which are secured to the struts 15 and retained thereon by means of retaining sleeves 26 and locking nuts 27.

The retaining sleeves 26 are welded to the struts 15 in the manner as shown in FIG. 1.

Operatively mounted on the underside of the die holding block 20 is a relatively flat horizontally disposed stripper plate 28 which is vertically shiftable with respect to the die holding block 20 and is adapted to strip the movable web 1 from the die holding block 20 after the forming operation. The stripper plate 28 is similarly provided with matching aligned apertures 29 which communicate with the cavities 21. The mechanism for shifting the stripper plate 28 is more fully described in the aforementioned Shelby et al. patent and, therefore, is neither illustrated nor described in detail herein.

A cooperating lower molding frame 30 is mounted in fixed relation on the carriage 7 below the point of travel of the web 1. The molding frame 30 generally includes a plug supporting frame or so-called die frame 31, which is substantially rectangular in horizontal cross section and is vertically reciprocable relative to the web 1. The plug supporting frame 31 is formed by a pair of transversely extending U-shaped channels 32, 33, which are connected by longitudinally extending side plates 34. Welded or otherwise rigidly secured to each of the side plates 34 near the forward and rearward transverse ends thereof are enlarged guide sleeves 35 which are disposed about each of the four upstanding guide rods 23, 24 for guiding the movement of the plug support frame 31 as it shifts vertically toward and away from the web 1. A horizontal support plate 36 is secured to the upper surface of the plug supporting frame 31 and bolted or otherwise rigidly secured to the upper surface of the support plate 36 are a series of upstanding plug assists or male dies 37, the exterior shape of which generally conforms to the interior shape of the finally molded articles. The male plug assists are maintained under a positive air pressure during the molding operation. The male plug assists 37 and the manifold structure for delivering air to the plug assists 37 is more fully described in U.S. Pat. No. 3,341,895.

A web clamping support plate 38 is interposed between the support plate 36 and the web 1 and is provided with rows of aligned apertures 39 for accommodating the plug assists 37 as the plug supporting frame 31 is shifted upwardly toward the web 1. The plate 38 is provided with four sockets 40 which are secured to the threaded upper ends of four spaced guide rods 41 which extend through guide apertures 42 formed in the support plate 36. The guide rods 41 are threadedly secured at their lower ends to the upper surface of a vertically shiftable horizontally disposed positive pressure frame 44 hereinafter described in detail. The web clamping support plate 38 supports a series of web clamping rings (not shown) and thereby forms a clamping frame which is adapted to move upwardly to bring the clamping rings into engagement with the bottom face of the web 1. A positive pressure bellows 43 of the type described in my U.S. Pat. No. 3,330,002 is disposed around each of the plug assists 37 and is sized to extend through the aperture 39 and engage the underside of the web 1 during molding operations. Inasmuch as this apparatus is more fully illustrated and described in U.S. Pat. No. 3,330,002, the operation thereof is neither illustrated nor described in detail herein.

The upper and lower die holding frames 18, 30 will shift with respect to each other and in timed relation to the reciprocative movement of the carriage 7 and the movable web 1. As this occurs, various selected areas of the web 1, which have been preheated by suitable banks of heaters 45, 46 described in my U.S. Pat. No. 3,331,908, will be forced into the cavities 21 by the male plug assists 37 and the material will form a container which substantially conforms to the size and shape of the cavities 21.

Figure 3:
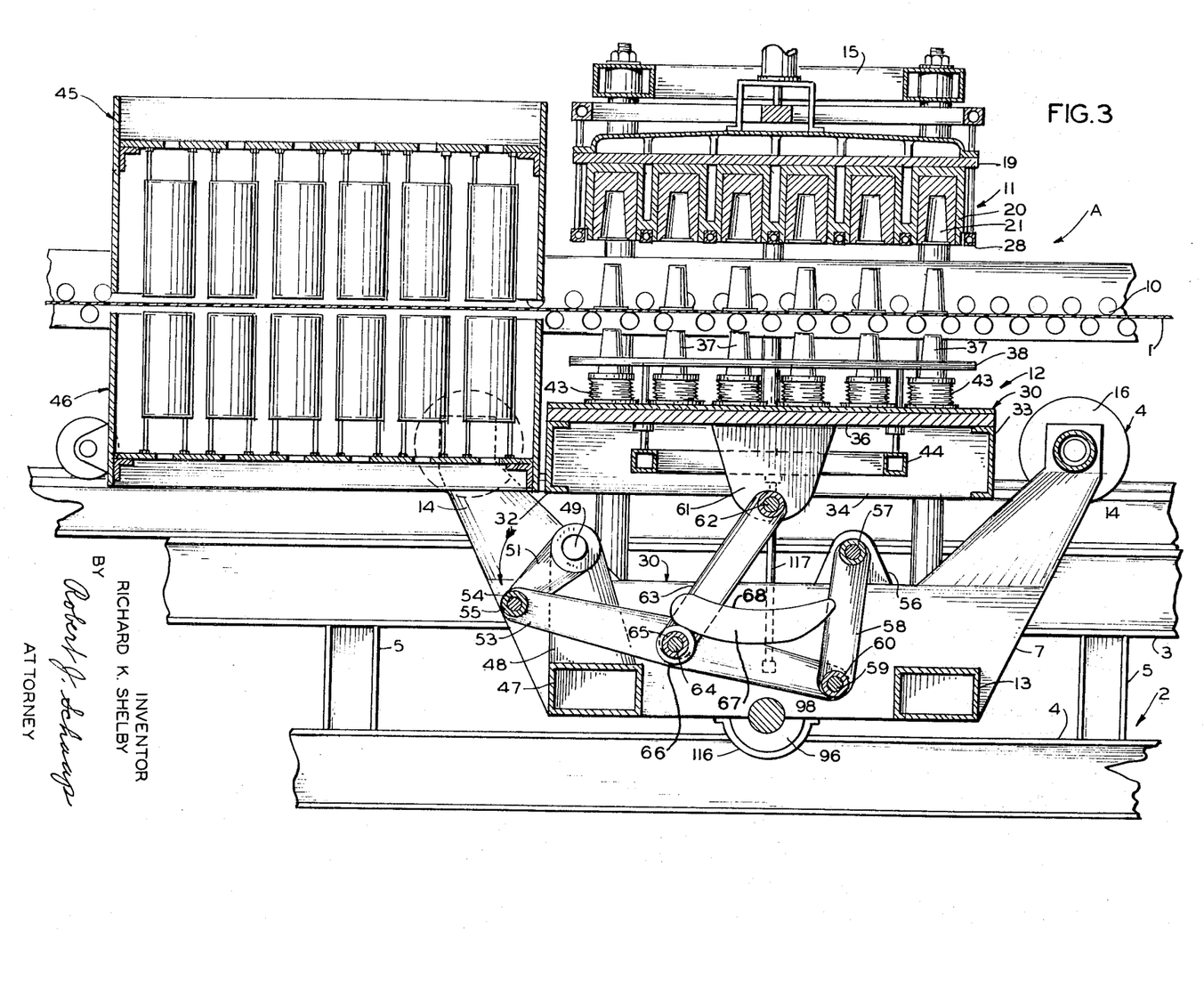
FIG. 3 is a longitudinal sectional view taken along line 3—3 of FIG. 2 and showing the upper and lower die frames in the extended position.

Welded to and extending between the two longitudinal members of the base 13 forming part of the molding carriage 7 is a cross beam 47 which, in turn, supports a pair of transversely spaced upstanding bearing support block 48. Journaled in and extending transversely through the bearing support blocks 48 is a transversely extending shaft 49 and mounted on the shaft 49 is a sprocket 50 in the manner as illustrated in FIG. 2. Mounted on each of the transverse ends of the shaft 49 are a pair of crank arms 51 having enlarged hubs 52. The hubs 52 are rigidly secured to the shaft 49 in any conventional manner so that they are rotatable therewith. The opposite ends of the crank arms 51 are pivotally connected to main drive rods or so-called "follower links" or "follower bars" 53 through pins 54 located in a knuckle joint 55 in the manner as illustrated in FIG. 3. Only one of the follower links 53 is illustrated in FIG. 3, the other follower link (not shown) being located on the opposite side of the lower carriage frame 12.

Welded or otherwise secured to the lower carriage frame 12 are a pair of upstanding bosses 56 and pivotally secured to the bosses 56 by means of pivot pins 57 are idler arms 58. The lower ends of each of the idler arms 58 are connected to the other end of the follower links 53 by means of pivot pins 59 located in knuckle joints 60 in the manner as illustrated by FIG. 3. By further reference to FIG. 3, it can be seen that the idler arms 58 are substantially longer than the crank arms 51. Accordingly, rotation of the crank arm 51 will cause an oscillatory movement of the right hand end of the follower link 53. The idler arms 58 will only move through the arc, but due to the length thereof will not rotate completely through a 360° path.

Rigidly secured to the underside of the support plate 36 forming part of the plug support frame 31 are a pair of transversely spaced downwardly extending clevis-forming plates 61 and pivotally secured to the brackets through pivot pins 62 are driving links 63. The other end of each of the driving links 63 is secured to the follower link 53 by means of pivot pins 64 located in knuckle joints 65. By further reference to FIG. 3, it can be seen that the pivot pin 64 and hence the point of pivotal connection of the drive link 63 is somewhat centrally of the length of the drive rod 53. Cam followers 66 are secured to this point of pivotal connection by the pins 64 for reasons which will presently more fully appear. In some cases, it may be desirable to split the drive links 63 somewhat centrally of their length for accommodating a pair of removable shoes (not shown) in order to marginally vary the overall length of the drive links 63.

Figure 5:
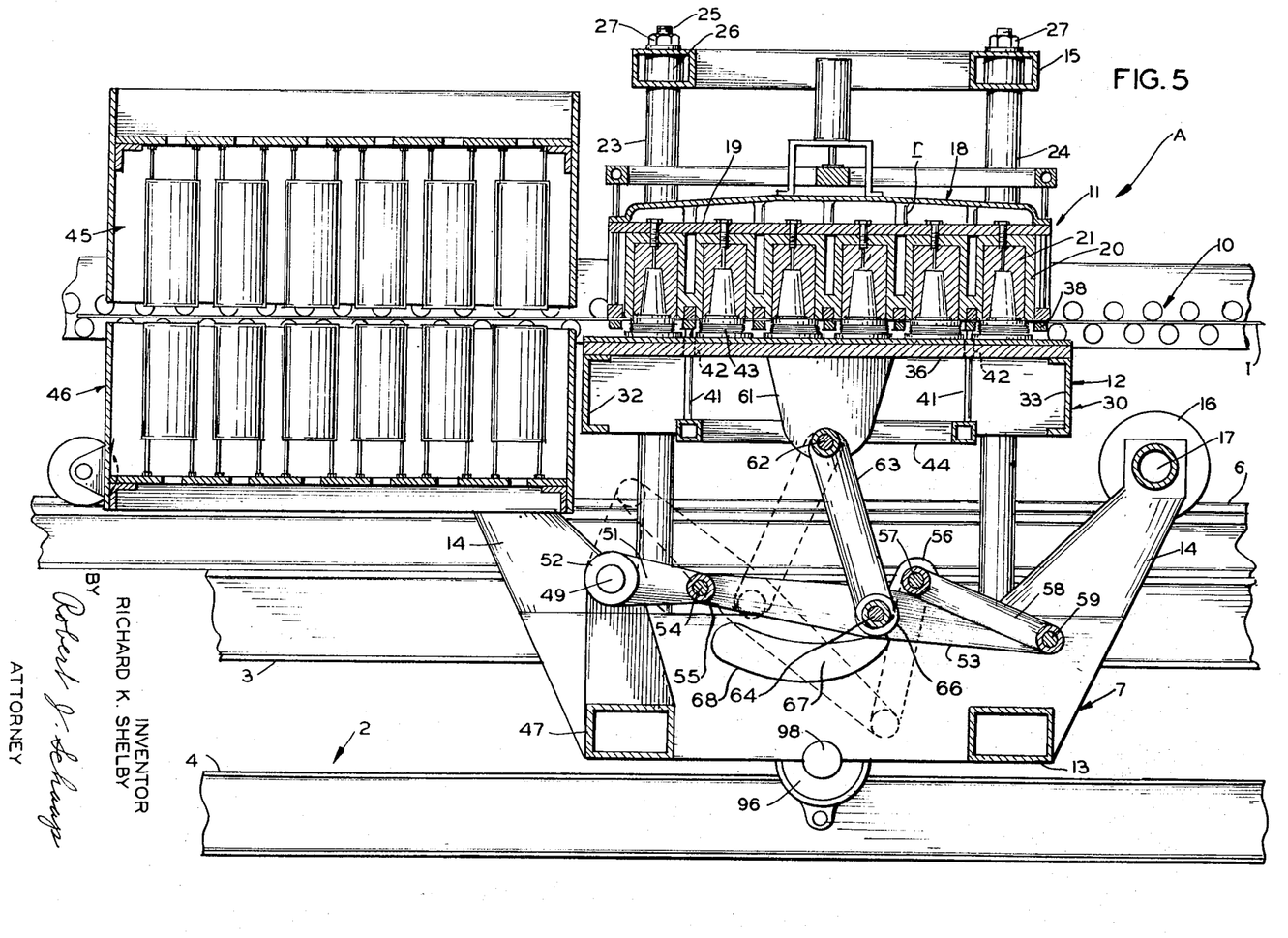
FIG. 5 is a longitudinal sectional view of the molding machine of FIG. 1 similar to the sectional view of FIG. 3, but showing the upper and lower die frames forming a part thereof in the "molding position"

It can be seen that as the crank arms 51 rotate, they will cause the follower links 53 to shift through the somewhat elliptical pattern as illustrated in FIG. 5. It is to be noted that the pattern causes the lower ends of the drive links 63 to shift to the right with the follower links 53 thereby raising the lower plug support frame 31 as it shifts. A cam 67 is secured to the molding carriage 7 and has a peripheral camming surface 68 which is essentially contemporaneous with the pattern caused by the movement of the lower end of the drive link 63. The cam followers 66 are movable on the camming surface 68 during the shifting movement of the drive link 63.

It is to be noted that the pattern created by the rotation of the crank arms 51 has a dwell period in which there is substantially no vertical movement of the drive links 63. This dwell period occurs when the follower links 53 have been shifted to the position where the drive links 63 are in a substantially vertical position. Furthermore, it is to be noted that in this dwell period when the lower plug support frame 31 has been shifted to its uppermost position (FIG. 5), the pivot pins 62 are vertically aligned with the pivot pins 64, which thereby creates a positive locking action. In other words, during this dwell period a downward pressure on the plug support frame 31 will create a downward force which creates a vector passing through the pivot pins 62 and the pivot pin 64. This position of the drive links 63 thereby creates the positive locking action against which the lower plug support frame 31 cannot shift downwardly.

By virtue of the fact that the cam followers 66 ride upon the camming surface 68, the plug support frame 31 cannot be urged downwardly by forces which may otherwise tend to collapse the various linking structures. In essence, it is the linking structure which enables the movement along the path defined by the camming surface and the cam follower 66 supported on the peripheral camming surface 68 create a rigid structure for supporting the plug support frame 31 in its shifting movement.

Continued rotation of the crank arms 51 will cause the following links 53 to shift to the left, reference being made to FIGS. 3 and 5. As this occurs, the idler arms 58 will also move in a counter-clockwise direction about the pins 57 thereby permitting the lower ends of the drive links 63 to shift to the left with the follower links 53 and thereby lowering the lower plug support frame 31.

Figure 6:
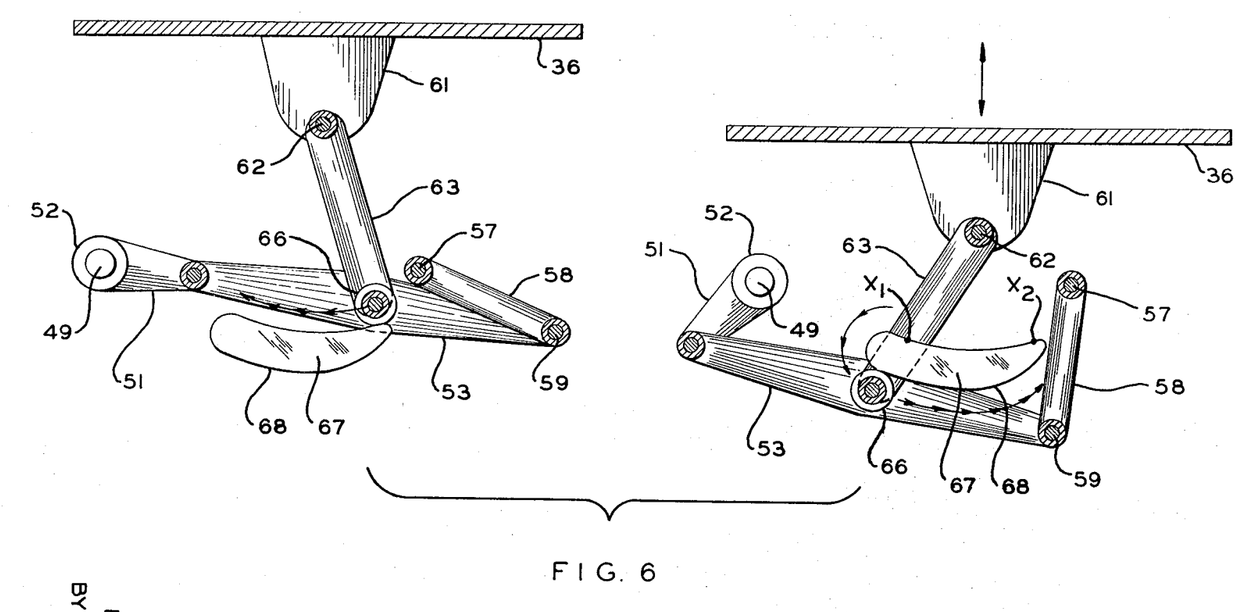
FIG. 6 is a schematic illustration showing the movement of a drive link in accordance with a path necessary to achieve proper movement of the die frames in the molding machine.

FIG. 6 illustrates the various positional movements of the follower links 53 and the drive links 63 as the cam followers 66 move along the camming surface 68. It can be seen that for a portion of the distance between points $X_1$ and $X_2$, the upper pivot point 62 remains in the same vertical plane. In this plane, the plug supporting frame 31 has achieved its uppermost position. Therefore, it can be seen that during the period of movement from the point $X_1$ to the point $X_2$, the dwell period is achieved.

Rigidly secured to the base 13 forming part of the lower carriage frame 12 are a pair of transversely aligned pillow blocks 96 which retain radial and thrust bearings 97. A transversely extending drive shaft 98 is provided with diametrally reduced transverse ends 99 which extend through and are journaled within the pillow blocks 96 in the manner as shown in FIG. 2. A pinion gear 100 is keyed to and rotatable with the drive shaft 98. The pinion gear 100 meshes with a rack bar (not shown) which is operatively connected to the main drive mechanism (also not shown) and reciprocates in timed relation thereto for oscillating the drive shaft 98 about its central axis.

The diametrally reduced ends 99 extend through the pillow blocks 96 and mounted on each of the transverse ends thereof are cylindrical sleeves 106 having integrally formed radially extending crank arms 107. Pivotally secured to the outer ends of the crank arms 107 through pivot pins 108 are rod couplings 109 which are provided with sockets for accommodating the lower threaded end of lifting rods 110. At their upper ends, the rods 110 are provided with fittings 111 and are pivotally secured to clevis-forming members 112 through pivot pins 113, the clevis-forming members 112 being rigidly secured to the upper die frame 18, all as best can be seen in FIGS. 1 and 2. Thus, it can be seen that as the drive shaft 98 rotates through the action of the pinion gear 100 and rack bar (not shown), the crank arms 107 will rotate through a 180° arc and thereby raise the lifting rod 110 and carry therewith the upper die frame 18. When the drive shaft 98 is rotated 180° in the opposite direction, the crank arms 107 will shift to their lowermost position as shown in FIG. 2 and through the action of the lift rod 110 will lower the upper die frame 18 to its lowermost position.

The cylindrical sleeves 106 are also integrally formed with eccentrically located cams 114 having camming surfaces 115. The cams are circular but eccentric location thereof produces high portions which are diametrally opposite, the crank arms 107. Thus, when the crank arms 107 are in their lowermost positions, the high portions of the camming surfaces 115 will be in their uppermost positions, as presently shown in FIG. 2. Concentrically disposed about each of the cams 114 are cam follower sleeves 116 which do not rotate with the cams 114 during their 180° movement but shift in a vertical direction as the cams 114 rotate. Each of the cam follower sleeves 116 is provided at its upper end with sockets for accommodating the lower threaded ends of crank rods 117. Secured to the upper ends of the crank rods 117 are yokes 118 for pivotal securement through pins 119 to flanges 120 formed on the underside of the positive pressure forming frame 44. Thus, it can be seen that when the shaft 98 is rotated in the counterclockwise direction, reference being made to FIG. 1, the sleeve 106 which are carried therewith will rotate the cranks arms 107 to their uppermost position and through the action of the lift rods 110 will raise the upper die frame 18 to its uppermost position. Contemporaneously with the lifting of the upper die frame 18, the camming surfaces 115 will shift to their lowermost position thereby shifting the cam follower sleeves 116 downwardly and through the action of the rods 117 will lower the positive pressure frame 44. Since the rods 41 are connected to the web clamping support plate 38, this plate will also be shifted to its lowermost position. Similarly, when the shaft 98 is rotated in the clockwise direction, the crank arms 107 will be shifted to their lowermost position as shown in FIG. 2, and thereby lower the upper die frame 18 through the action of the lift rods 110. Simultaneously therewith, the camming surfaces 115 will, through the action of the rods 117, shifts the frame 44 and the plate 38 to their uppermost positions thereby maintaining a postive pressure seal against the underside of the web 1.

OPERATION

In use, the web 1 is continually advancing through the molding machine A by the web moving and gripping structure 10. The carriage 7 is reciprocated in its forward and retracting movements by an automatic system (not shown) so that it intermittently advances through a predetermined path at the same speed as the web 1. The cycle is started when the carriage 7, which is at its rearwardmost position, reference being made to FIG. 1, moves simultaneously with the web 1 in a forwardly direction. The cycle is, of course, completed after the carriage 7 has reached its forwardmost position and is then returned to its initial starting position.

The power mechanism (not shown) will actuate the shaft 49 and the drive shaft 98 and cause rotation of the shaft 49 and oscillation of the shaft 98 in timed relationship in order to cause the upper and lower die frames 18, 31 to cooperate and engage the web of thermoplastic material. As the shaft 49 rotates, it will rotate the crank arms 51 in the clockwise direction, reference being made to FIGS. 3 and 5. From the position as illustrated in FIG. 3, it can be seen that the two die frames 18, 31 are separated and located in their extendedmost position. The rotation of the crank arms 51 in the clockwise direction will cause the drive bar 53 to initially shift to the left until the crank arm 51 is located in a truly vertical position. At this point, the follower links 53 will begin to shift to the right and will follow the somewhat elliptical pattern as illustrated in the dotted lines in FIG. 5 and in FIG. 6. As this occurs, the pivotal connection between the follower link 53 and the links 63, namely the pin 64 which carries the cam followers 66, will also shift upwardly and to the right. The cam followers 66 riding on the camming surface 68 will cause an upward shifting movement of the plug support frame 31 in the vertical direction as the drive link 63 continues to shift. This will cause the drive link 63 to shift the plug support frame 31 upwardly in a vertical direction. Continued rotation of the crank arms 51 will shift the follower link 53 to the beginning point of a dwell period as illustrated in FIG. 5. During the portion of this dwell period, the drive link 63 will shift from a position as illustrated in the dotted line of FIG. 5 to a position as illustrated in the solid lines of FIG. 5. During a portion of this movement, the pivot pin 64 will be somewhat substantially vertically disposed beneath the pivot pin 62. During this dwell period, the plug support frame 31 will have been shifted to its uppermost position where it engages the underside of the web 1. This dwell period will occur momentarily even though the crank arm 51 continues to rotate.

When the lower plug support frame 31 has been shifted to its uppermost position, the upper carriage frame 11 will shift downwardly in a manner hereinafter described in detail and cause the plug assists 37 to force the heated web 1 into the cavity 21. The actual method of positive pressure formation of the plastic articles is more fully illustrated in U.S. Pat. No. 3,341,895.

As the follower link 53 and the drive link 63 follow the trajectory as illustrated in FIGS. 5 and 6, the drive shaft 98 will rotate the crank arms 107. When the upper die frame 18 is in its uppermost position, the crank arms 107 are in their uppermost position and will be shifted to their lowermost positions through rotation of the drive shaft 98. The lift rods 110 will thereby lower the upper die frame 18 to its lowermost position as shown in FIGS. 3 and 4.

Figure 4:
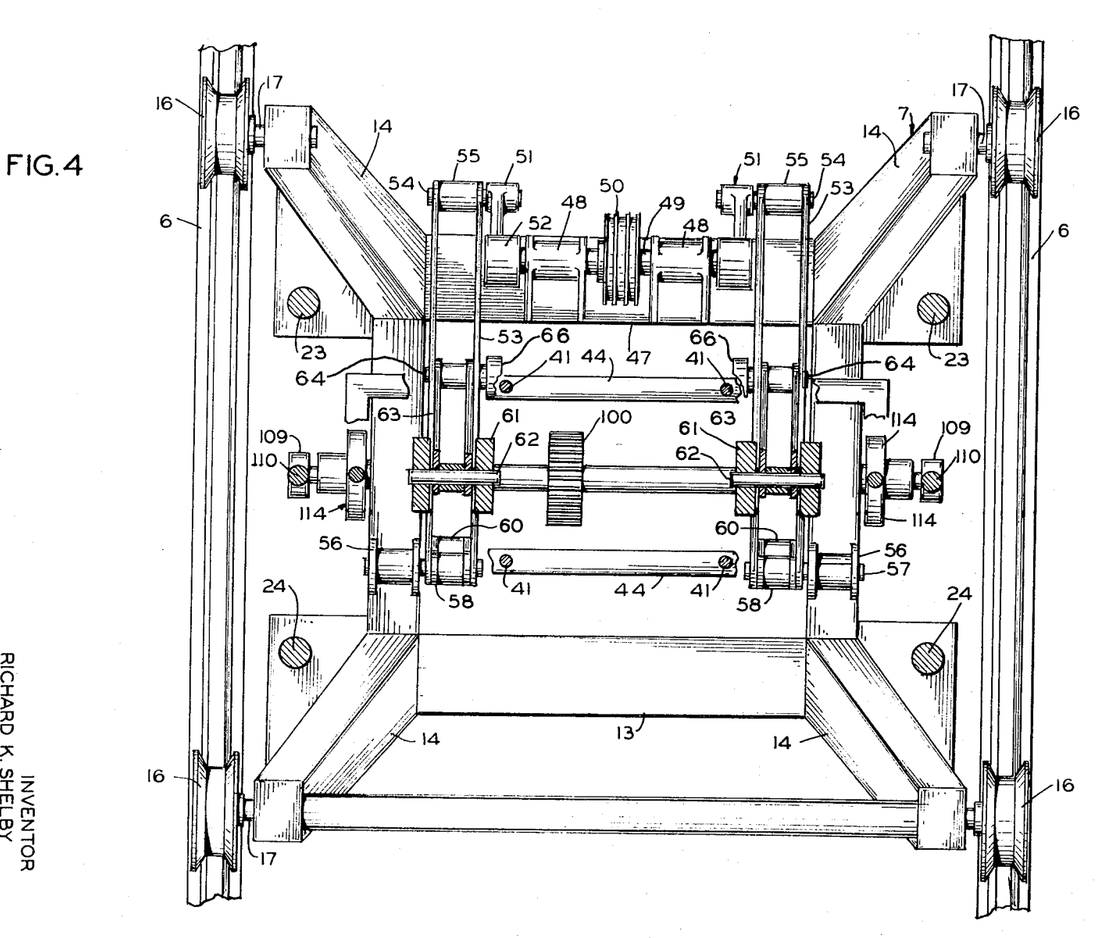
FIG. 4 is a horizontal sectional view taken along line 4—4 of FIG. 2.

Simultaneously with the shifting of the lower die frames 18, 31 respectively, the camming surfaces 115 will be shifted to their uppermost position as shown in FIG. 4. The cam follower sleeves 116 will thereby lift the rods 117 and thus shift the positive pressure forming frame 44 to its uppermost position as shown in FIG. 4. The guide rods 41, which extend through the frame 31 will lift the plate 38 to its uppermost position where it engages the underside of the web 1 and forms an effective positive pressure seal. In this connection, it should be noted that both the upper and lower die frames 18, 31 each shift through a total distance of 6" when they are lowered and raised respectively. The positive pressure plate 38 will shift through a total of 2" when it is raised to the position as shown in FIG. 5, so as to hold a cup-making section of the web in fixed relation to each set of forming members during the forming operation. The plug assists 37 will engage the web of thermoplastic material and force the same into the female die cavities 21 to form containers substantially as shown in FIG. 5.

After the carriage 7 has reached its forwardmost position of travel, it will immediately shift back to its initial position. However, during the shifting movement of the carriage 7 back to its initial position, the drive mechanism continues to rotate the crank arms 51. As this occurs, the follower links 53 and the cam follower 68 will follow the lower portion of the trajectory as illustrated in FIG. 5. The pivot pins 62, 64 will follow the trajectory and will shift downwardly and to the left so that the lower plug support frame 31 is shifted downwardly. When the carriage 7 has reached its rearwardmost position of travel, the crank arm 51 will be in the position as illustrated in FIG. 3. At this point, the plug support frame 31 will be in its lowermost position of travel.

Simultaneously with the shifting of the lower die frame 31, the continued movement of the drive shaft 98 will move the crank arms 107 to their uppermost position. This will, in turn, shift the upper die frame 18 to its uppermost position through the action of the lift rods 110. The rotation of the shaft 98 will also cause the camming surfaces 115 to be shifted to their lowermost position and the cam follower sleeves will shift the positive pressure frame 44 downwardly to its lowermost position as shown in FIG. 3. The rods 41 will then move the plate 38 to its lowermost position as shown in FIG. 3.

By means of the above-outlined construction, it can be seen that both the upper and lower die frames 18, 31 are shifted by means of mechanical structure rather than pneumatic structure and therefore when they are held in the locked position, they will not yield against pneumatic cylinders. Moreover, the link system provides an effective locking means which will not yield even against extreme pressure from the upper die frame 18.

It should be observed that the present invention is not limited to a driving mechanism for molding machines having a shiftable platen. The driving mechanism of the present invention can be used in essentially any type of device which requires a timed movement of a work member with respect to a work piece. For example, the drive mechanism of the present invention could effectively find employment in presses and similar types of devices. It should, therefore, be understood that changes and modifications can be made in the form, construction, arrangement and combination of parts presently described and pointed out without departing from the nature and principle of my invention.

Having thus described my invention, what I desire to claim and secure by Letters Patent is:

1. A driving assembly for shifting a first work holding frame with respect to a second work holding frame and with respect to a work piece disposed between said first and second work holding frames, said first and second frames being operatively disposed on a base means, said driving assembly comprising means for passing said work piece between said frames, rotatable drive means operatively mounted on said base means, a drive member operatively connected to said drive means for reciprocative movement, link means pivotally secured to said drive member through a pivotal connection, said pivotal connection moving through a somewhat elliptical path during movement of said drive means, and camming means responsive to rotation of the drive means and operatively connected to said pivotal connection for reciprocatively shifting the first of said cooperating die frames toward and away from the work piece in timed relation to the movement of the work piece.

2. The driving assembly of claim 1 further characterized in that an additional drive member link means and camming means is operatively mounted on said base means for reciprocatively shifting the second of said work holding frames toward and away from the moving work piece and in timed relation to the movement of the first of said work holding frames.

3. The driving assembly of claim 1 further characterized in that said drive member moves in a path where a dwell period of no movement of the link means relative to the direction of movement of said work holding frame exists for a portion of said path.

4. A driving assembly for shifting a first work holding frame with respect to a second work holding frame and with respect to a work piece disposed between said first and second work holding frames, said first and second frames being operatively disposed on a base means, said driving assembly comprising means for passing said work piece between said frames, rotatable drive means operatively mounted on said base means, a drive member, first pivot means pivotally securing said drive member to said rotatable drive means, second pivot means pivotally securing said drive member to said base means, and link means responsive to rotation of the drive means and pivotally secured to said drive member and to the first of said work holding frames for reciprocatively shifting the first of said cooperating work holding frames toward and away from the work piece in timed relation to the movement of the work piece.

5. The drive assembly of claim 4 further characterized in that an additional drive member and link means is operatively mounted on said base means for reciprocatively shifting the second of said work holding frames toward and away from the moving work piece and in timed relation to the movement of the first of said work holding frames.

6. The driving assembly of claim 4 further characterized in that said drive member moves in a path where a dwell period of no movement of the link means relative to the direction of movement of said work holding frame exists for a portion of said path.

7. A molding machine comprising a supporting frame, a pair of oppositely disposed cooperating die frames operatively mounted on said supporting frame, means for passing a web of moldable material between said die frames, rotatable drive means operatively mounted on said supporting frame, a drive member operatively connected to said drive means for reciprocative movement, link means pivotally secured to said drive member through a pivotal connection, said pivotal connection moving through a somewhat elliptical path during reciprocative movement of said drive means, and camming means responsive to rotation of the drive means operatively connected to said pivotal connection for reciprocative shifting movement of the first of said cooperating die frames toward and away from the web in timed relation to the movement of the web responsive to rotation of the drive means.

8. The molding machine of claim 7 further characterized in that an additional drive member and link means is operatively mounted on said supporting frame for reciprocatively shifting the second of said die frames toward and away from the moving web and in timed relation to the movement of the first of said die frames.

9. The molding machine of claim 7 further characterized in that said drive member moves in a path where a dwell period of no movement relative to the direction of movement of said die frame exists for a portion of said path.

10. A molding machine comprising a supporting frame, a pair of oppositely disposed cooperating die frames operatively mounted on said supporting frame, means for passing a web of moldable material between said die frames, rotatable drive means operatively mounted on said supporting frame, a drive member, first pivot means pivotally securing said drive member to said rotatable drive means, second pivot means pivotally securing said drive member to said supporting frame, link means pivotally secured to said drive member and to the first of said die frames for reciprocatively shifting the first of said cooperating die frames toward and away from the web in timed relation to the movement of the web responsive to rotation of the drive means.

11. The molding machine of claim 10 further characterized in that an additional drive member and link means is operatively mounted on said supporting frame for reciprocatively shifting the second of said die frames toward and away from the moving web and in timed relation to the movement of the first of said die frames.

12. The molding machine of claim further characterized in that the first pivot means pivotally secures the drive member to said rotatable drive means eccentric to the axis of rotation of said rotatable drive means.

13. The molding machine of claim 10 further characterized in that said drive member moves in a path where a dwell period of no movement relative to the direction of movement of said die frame exists for a portion of said path.

14. The molding machine of claim 10 further characterized in that said molding machine includes a pair of oppositely disposed cooperating rotatable drive means, drive members and link means.

15. The molding machine of claim 10 further characterized in that said link means comprises a single link, and the pivotal connection of said link and first die frame and said second pivot means lies in a vertical line when said first die frame is shifted to its extendedmost position.

16. The molding machine of claim 10 further characterized in that said second pivot means comprises an element which is pivotal about an axis and said drive member is pivoted to said element at a point eccentric to its axis.

17. The molding machine of claim 11 further characterized in that the first of said die frames is a lower die frame and the second of said die frames is an upper die frame whereby said upper and lower die frames are oppositely and vertically disposed and located on opposite sides of said web.

18. A molding machine comprising a supporting frame, a pair of oppositely disposed cooperating first and second die frames operatively mounted on said supporting frame, means for passing a web of moldable material between said die frames, rotatable drive means operatively mounted on said supporting frame, a drive member, first pivot means pivotally securing said drive member to said rotatable drive means, second pivot means pivotally securing said drive member to said supporting frame, a shaft operatively mounted on said supporting frame and being adapted for movement about its central axis in timed relation to the movement of said web responsive to rotation of said drive means, link means pivotally secured to said drive member, crank means connecting said link means to said shaft for moving said shaft about its central axis, camming means operatively mounted on said shaft and rotating therewith, and rod means for shifting the first die frame in cooperative time related movement to the web.

19. The molding machine of claim 18 further characterized in that means is operatively mounted on said supporting frame for reciprocatively shifting said second die frame toward and away from said web in timed relation to the movement of the web and said first die frame.

20. The molding machine of claim 18 further characterized in that the rod means is eccentrically mounted on the camming means.

21. The molding machine of claim 18 further characterized in that a web clamping frame is operatively mounted on said supporting frame and being horizontally disposed between said web and said first die frame, and means operatively associated with said shaft for shifting said clamping frame into and out of clamping position with said web in timed relation to the movement of the die frames.

22. A molding machine comprising a supporting frame, a pair of oppositely disposed upper and lower die frames operatively mounted upper and lower die frames operatively mounted on said supporting frame and being adapted to shift toward and away from each other, means for passing a continuously moving web of moldable material between said die frames along a substantially horizontal path, a web clamping frame operatively mounted on said supporting frame and being horizontally disposed between said web and said lower die frame, means operatively mounted on said supporting frame for reciprocatively shifting the upper die frame toward and away from the moving web in timed relation to the shifting movement of the lower die frame, a drive member operatively mounted on said supporting frame and being rotatable about a first axis, means for rotating said drive member in timed relation to the shifting movement of the upper die frame, a drive bar, a means for pivotally securing said drive bar at one end to said drive member at a point eccentric to its axis of rotation, an oscillating member pivotally secured to said supporting frame and being oscillatable about a second axis, means for pivotally securing the opposite end of said drive bar to said oscillating member at a point eccentric to the second axis, and a drive link pivotally secured at its lower end to said drive bar and being pivotally secured at its upper end to said lower die frame, said drive bar being moved in a path responsive to rotation of said drive member, where said link urges said lower die frame to its uppermost position during a portion of the movement through said path, said link being disposed in a substantially vertical position when said lower die frame is shifted to its uppermost position.

23. A molding machine comprising a supporting frame, a pair of oppositely disposed upper and lower die frames operatively mounted on said supporting frame and being adapted to shift toward and away from each other, means for passing a continuously moving web of moldable material between said die frames along a substantially horizontal path, a web clamping frame operatively mounted on said supporting frame and being horizontally disposed between said web and said lower die frame, means operatively mounted on said supporting frame for reciprocatively shifting the lower die frame toward and away from the moving web in timed relation to the shifting movement of the upper die frame, a drive member operatively mounted on said supporting frame and being rotatable about a first axis, means for rotating said drive member in timed relation to the shifting movement of the lower die frame, a drive bar, means for pivotally securing said drive bar at one end to said drive member at a point eccentric to its axis of rotation, an oscillating member pivotally secured to said supporting frame and being oscillatable about a second axis, means for pivotally securing the opposite end of said drive bar to said oscillating member at a point eccentric to the second axis, a shaft operatively mounted on said supporting frame and being adapted for movement about a central axis in timed relation to the movement of said web, responsive to rotation of said drive means, first camming means operatively mounted on said shaft and rotating therewith, rod means connecting said upper die frame and said first camming means for shifting the upper die frame in cooperative time related movement to the lower die frame, second camming means operatively associated with said shaft for shifting said clamping frame into and out of clamping position with said web in timed relation to the movement of the upper and lower die frames, a bell crank operatively associated with said shaft for causing rotation thereof, and link means pivotally connected to said drive bar and to said bell crank for rotating said shaft in timed related movement to the rotation of said drive member, whereby shifting movement of said drive bar will shift said link means and cause rotation of said shaft thereby creating the shifting movement of the upper die frame and said web clamping frame.

24. A molding machine comprising a supporting frame, a pair of oppositely disposed upper and lower die frames operatively mounted on said supporting frame and being adapted to shift toward and away from each other, means for passing a continuously moving web of moldable material between said die frames along a substantially horizontal path, a web clamping frame operatively mounted on said supporting frame and being horizontally disposed between said web and said lower die frame, a drive member operatively mounted on said supporting frame and being rotatable about a first axis, means for rotating said drive member in timed relation to the shifting movement of the upper die frame, a drive bar, a means for pivotally securing said drive bar at one end to said drive member at a point eccentric to its axis of rotation, an oscillating member pivotally secured to said supporting frame and being oscillatable about a second axis, means for pivotally securing the opposite end of said drive bar to said oscillating member at a point eccentric to the second axis, a drive link pivotally secured at its lower end to said drive bar and being pivotally secured at its upper end to said lower die frame, said drive bar being moved in a path responsive to rotation of said drive member, where said link urges said lower die frame to its uppermost position during a portion of the movement through said path, said link being disposed in a substantially vertical position when said lower die frame is shifted to its uppermost position, a shaft operatively mounted on said supporting frame and being adapted for movement about a central axis in timed relation to the movement of said web, responsive to rotation of said drive means, first camming means operatively mounted on said shaft and rotating therewith, rod means connecting said upper die frame and said first camming means for shifting the upper die frame in cooperative time related movement to the lower die frame, second camming means operatively associated with said shaft for shifting said clamping frame into and out of clamping position with said web in timed relation to the movement of the upper and lower die frames, a bell crank operatively associated with said shaft for causing rotation thereof, and link means pivotally connected to said drive bar and to said bell crank for rotating said shaft in timed related movement to the rotation of said drive member, whereby shifting movement of said drive bar will shift said link means and cause rotation of said shaft thereby creating the shifting movement of the upper die frame and said web clamping frame.

References Cited

UNITED STATES PATENTS

| | | | |
|---|---|---|---|
| 2,047,458 | 7/1936 | Brewer | 74—40 |
| 2,269,389 | 1/1942 | Weida | 18—16 T |
| 2,539,258 | 1/1951 | Lindland | 74—40 |
| 2,559,377 | 7/1951 | Soderquist | 18—16 T |
| 3,081,491 | 3/1963 | Black | 18—19 F |
| 3,172,159 | 3/1965 | Edwards | 18—19 F |
| 3,268,952 | 8/1966 | Shelby | 18—19 F |

ROBERT L. SPICER, JR., Primary Examiner

U.S. Cl. X.R.

74—40

PO-1050
(5/69)

UNITED STATES PATENT OFFICE
CERTIFICATE OF CORRECTION

Patent No. 3,667,885            Dated    June 6, 1972

Inventor(s) Richard K. Shelby

It is certified that error appears in the above-identified patent and that said Letters Patent are hereby corrected as shown below:

Column 5, line 45, delete "Secure" and insert - - - Secured - - -.

Column 12, Claim 12, after "claim" insert - - - 10 - - -.

Signed and sealed this 26th day of September 1972.

(SEAL)
Attest:

EDWARD M. FLETCHER, JR.           ROBERT GOTTSCHALK
Attesting Officer                    Commissioner of Patents